United States Patent [19]

Saunders et al.

[11] 4,182,777
[45] Jan. 8, 1980

[54] CO-DRIED YEAST WHEY FOOD PRODUCT AND PROCESS

[75] Inventors: Elmer J. Saunders, Downers Grove; Terry A. Lappin, Naperville, both of Ill.

[73] Assignee: Standard Oil Company (Indiana), Chicago, Ill.

[21] Appl. No.: 773,205

[22] Filed: Mar. 1, 1977

[51] Int. Cl.² ............................................. A23B 4/04
[52] U.S. Cl. .................................... 426/62; 426/471; 426/583; 426/656; 426/658
[58] Field of Search ....................... 426/41, 42, 60, 62, 426/656, 443, 471, 583, 317, 658

[56] References Cited

U.S. PATENT DOCUMENTS

| | | | |
|---|---|---|---|
| 2,661,294 | 12/1953 | Meade | 426/471 |
| 3,708,307 | 1/1973 | Lundstedt | 426/471 |
| 3,720,519 | 3/1973 | Hamilton et al. | 426/656 |
| 3,728,128 | 4/1973 | Luksas | 426/41 |
| 3,818,109 | 6/1974 | Bechtle | 426/41 |
| 3,873,751 | 3/1975 | Arndt | 426/656 |

OTHER PUBLICATIONS

"Fermentation Process Turns Whey into Valuable Protein," *Chem. Eng.*, vol. 82, No. 6, (1975), pp. 36-37.

*Primary Examiner*—Thomas G. Wiseman
*Attorney, Agent, or Firm*—Mark DiPietro; Arthur G. Gilkes; William T. McClain

[57] ABSTRACT

Protein containing food products are prepared by a process in which yeast is codried with whey. The codried yeast-whey food is suitable for human foods. Preparations containing yeast-whey product do not have a yeast character or flavor in some food applications.

18 Claims, No Drawings

CO-DRIED YEAST WHEY FOOD PRODUCT AND PROCESS

BACKGROUND OF INVENTION

1. Field of Invention

This invention relates to protein containing single cell microorganisms. More particularly, this invention relates to food ingredients made by codrying yeast with whey. Also this invention relates to foods prepared using the codried yeast-whey product. More particularly this invention also relates to a process used to prepare the codried yeast-whey product.

2. Description of the Prior Art

A number of bio-synthetic processes have been created to produce protein containing foods from microorganisms. Yeast is a microorganism which may be grown in quantity to produce a multifunctional food product. In some applications yeast suffers from the disadvantage that it retains an undesirable yeast flavor and character.

Whey is a waste product of the dairy industry. Whey is a liquid with suspended solids which remain after the solid cheese is recovered. In general whey is not usable as human food. most of the world's whey is wasted.

Raw whey contains about 5% by weight dairy solids. Condensed whey can contain solids ranging from about 30% to about 70% by weight. Whey can be a nutritious food for humans if processed into an edible food.

However whey, like yeast, when individually dried retains an unpleasant flavor and character. Also whey cannot be dried in a single step to a suitable non-hygroscopic powder. In some food applications the whey retains poor functionality and flavor.

Thus a need existed for a treatment of yeast and whey which would improve the properties of the yeast and the whey. Accordingly it is an object of the invention to utilize whey which is generally wasted. It is also an object of the invention to provide a process which dries whey in conventional single step drying methods. Another object of the invention is to produce a product which does not exhibit the unpleasant flavors of yeast and whey. Another object of the invention is to produce a food ingredient which increases cooking yields in some food systems.

Patents to which the invention relates include U.S. Pat. Nos. 2,809,113; 3,720,519; and 3,728,128.

U.S. Pat. No. 2,809,113 relates to fermenting whey with microorganisms to produce high-protein animal feeds. The yeast is grown on numerous substrates including whey. Once the optimum amount of yeast is grown, the cells are harvested and the cell walls are broken. The protein rich material can be recovered in a liquid state to be added to animal feeds, or the liquid can be spray dried to produce a powder food.

U.S. Pat. No. 3,720,519 relates to production of a flavor potentiator comprising dried yeast fermented whey. A flavor potentiator is a substance when added to foods enhances and increases the material food flavor. This specific flavor potentiator is formed by microbiologically altering whey. The whey is fermented with a culture of yeast. The fermented whey when dried to low moisture content functions as a flavor potentiator.

U.S. Pat. No. 3,728,128 describes the production of a bland whey product. Growing yeast on whey substrate produces a product which eliminates the strong flavor and odor present in whey. The cheese whey is placed in an aerobic vessel, warmed and inoculated with yeast cells. Oxygen is supplied to permit assimilation of the whey. The yeast is allowed to grow to the optimum amount. The medium containing the yeast whey product is pasteurized and spray dried to a bland flake. The food is suitable for human consumption.

SUMMARY OF THE INVENTION

In one aspect, the invention resides in a process for making an improved food product comprising preparing an aqueous suspension of yeast and whey and drying the suspension. The yeast-whey suspension can be produced by combining a yeast cream, generally having from about 10% to about 20% by weight solids, and whey, generally having from about 3% to about 70% by weight solids. It is preferred that the yeast-whey suspension have from about 30% to about 40% by weight of the total solids as whey solids. The suspension preferably is pasteurized prior to codrying. Alternatively the yeast cream and the whey suspension may be individually pasteurized. The pasteurization step can be performed at a temperature from about 160° F. to about 195° F. Preferably the suspension is spray dried at an outlet temperature of from 180° F. to about 210° F. to produce a product of low moisture.

Another aspect of the invention resides in the food products which contain the yeast-whey codried product. Products which contain the codried yeast-whey product include cakes, puddings, space extenders, flavor ingredients, margarines, muffins, meat containing luncheon loaves, chicken coating batter, chiffon pie filling, and mushroom soup bases. Specifically the invention resides in a process for making an improved food product comprising mixing a *Candida utilis* yeast and a dairy whey suspension pasteurizing the yeast and the whey suspension, and spray drying the yeast-whey suspension.

More specifically the invention resides in a process for making an improved food product comprising mixing a yeast cream, of *Candida utilis* yeast, and an aqueous dairy whey suspension, pasteurizing the suspension at a temperature of from about 160° F. to about 195° F., and spray drying the suspension at an outlet temperature of about 180° F. to about 210° F.

Particularly, the invention resides in a process for making an improved food product comprising mixing a *Candida utilis* yeast cream and an aqueous whey suspension in such proportions that of the total solids about 20% to about 50% by weight are whey solids, pasteurizing the suspension at a temperature of about 160° F. to about 195° F., and spray drying the mixture at an outlet temperature of about 180° F. to about 210° F. to yield a product of less than 5% by weight moisture. Also specifically the invention resides in the above process wherein the whey solids are 30% or 40% by weight of the total solids in the yeast-whey suspension.

The invention also particularly resides in the products which are prepared according to the processes as set out in the preceding paragraphs.

A synergistic effect has been discovered in codrying yeast and whey. The codrying process produces a product which when used in various foods lacks objectionable yeast or whey flavors. This reduced flavor influence enhances the utility of codried yeast-whey as a food ingredient. The codrying process has been shown to impart better functionality and characteristics to food. Meat products which have codried yeast-whey ingredients shrink less, lose less cooking fluid and have better taste and mouthfeel. The whey is dried in conjunction with the yeast easily and in one step to a typically non-hygroscopic powder.

The yeast product of commercial fermentors is about 3% by weight yeast cells. This product is centrifuged or filtered to produce a yeast product about 10% to about 20% yeast cells. This concentrated product is called a yeast cream.

In the spray drying process the temperature at the outlet of the spray drier is used to control the amount of moixture in the final product. High outlet temperatures produce codried yeast-whey product with low moisture content. A codried yeast-whey product with low moisture is easy to handle and with ordinary precautions retains free flowing properties.

DESCRIPTION OF SPECIFIC EMBODIMENTS

Example I

1600 Gallons of *Candida utilis* yeast cream, in aqueous suspension of about 18% solids by weight, and 551 gallons of condensed No. 2 cheddar whey of about 39% solids by weight in an aqueous suspension were blended in a 4000 gallon vessel. The mixture was pasteurized at 174° F.–179° F. for a residence time of about 3 minutes. The suspension was then fed to a spray drier operating at 483° F. to 497° F. inlet, and 201° F. to 203° F. outlet temperatures. About 4500 pounds of product were collected from the drying operation. The moisture content of the codried yeast-whey was about 4.0% by weight. The whey content of the codried yeast-whey product was 40% by weight.

The material made in Example I had the following properties:

|  | pH | Bulk densities (lb/ft³) | Water solubles (%) | Emulsion capacity (ml oil/gm) | Water molding (ml/gm) |
|---|---|---|---|---|---|
| codried yeast whey | 6.0 | 25.0 | 44.8 | 43.0 | 0.7 |
|  | fat holding (ml/gm) 1.4 |  |  | titratable acid(%) 1.2 |  |

Example II

A yeast-whey codried product containing 31% by weight whey solids and 60% by weight yeast was used to replace 50% and 75% of the whole egg in chocolate cake. The chocolate cake was of conventional preparation in all respects except egg substitution. As an egg substitute, yeast powder, yeast-whey, dry blend powder and codried yeast-whey were used. Only the cake made with codried yeast-whey had a sweet flavor which had no yeasty taste. The chocolate flavor was enhanced and the texture of the cake was unaffected.

Example III

Yellow cakes were prepared as shown in the Table II. The egg was substituted in various proportions by a codried yeast-whey product. Up to 1.0% dry weight of the total cake was yeast-whey product. Similar cakes were made of dry blended yeast-whey and dry yeast. The codried yeast-whey product added no yeast flavor to the cakes. The dry blended yeast-whey did impart a yeast flavor to the cakes. The cakes were not effected by the codried yeast-whey product in volume or appearance.

Example IV

A chocolate cooked pudding and a vanilla cooked pudding were prepared wherein 25% of the milk solids in the puddings were replaced by codried yeast-whey product containing about 30% by weight whey. The following recipes were followed.

| CHOCOLATE COOKED PUDDING | | |
|---|---|---|
|  | PERCENT BY WEIGHT | |
| INGREDIENTS | Test | Control |
| Sugar | 12.26 | 12.26 |
| Unmodified corn starch | 3.77 | 3.77 |
| Cocoa (Natural 10-12% fat) | 2.69 | 2.69 |
| Salt | 0.04 | 0.04 |
| Carrageenan | 0.05 | 0.05 |
| Non-fat dry milk | 6.09 | 8.12 |
| Yeast-whey | 2.03 | 0.00 |
| Water | 73.07 | 73.07 |

| DIRECTIONS | |
|---|---|
| 1. | Mix dry ingredients. |
| 2. | Mix water with dry ingredients and heat in pan to 160° F. and hold for 10 minutes. |
| 3. | Cool to 70° F. |

TABLE II

REPLACEMENT OF EGG AND NFDM IN A STANDARD YELLOW CAKE RECIPE

| Ingredients | Weight - grams | | | | | | |
|---|---|---|---|---|---|---|---|
|  | Control | Test 1 | Test 2 | Test 3 | Test 4 | Test 5 | Test 6 |
| Cake fluor | 137.76 | 137.76 | 137.76 | 137.76 | 137.76 | 137.76 | 137.76 |
| Sugar | 165.36 | 165.36 | 165.36 | 165.36 | 165.36 | 165.36 | 165.36 |
| Emulsified shortening | 74.4 | 74.4 | 74.4 | 74.4 | 74.4 | 74.4 | 74.4 |
| Dry egg | 19.32 | 9.66 | 4.83 | 0.0 | 0.0 | 19.32 | 19.32 |
| Salt | 5.52 | 5.52 | 5.52 | 5.52 | 5.52 | 5.52 | 5.52 |
| Baking powder | 6.18 | 6.18 | 6.18 | 6.18 | 6.18 | 6.18 | 6.18 |
| Nonfat dry milk | 13.8 | 13.8 | 13.8 | 13.8 | 10.35 | 3.45 | 0.0 |
| Vanilla | 1.38 | 1.38 | 1.38 | 1.38 | 1.38 | 1.38 | 1.38 |
| Water | 176.28 | 176.28 | 176.28 | 176.28 | 176.28 | 176.28 | 176.28 |
| Codried yeast-whey | 0.0 | 9.66 | 14.49 | 19.32 | 22.77 | 10.35 | 13.8 |
| Egg replacement level | 0.0 | 50% | 75% | 100% | 100% | 0.0 | 0.0 |
| NFDM replacement level | 0.0 | 0.0 | 0.0 | 0.0 | 25% | 75% | 100% |

| VANILLA COOKED PUDDING | | |
|---|---|---|
|  | PERCENT BY WEIGHT | |
| INGREDIENTS | Test | Control |
| Sugar | 10.33 | 10.33 |
| Unmodified corn starch | 3.18 | 3.18 |
| Dextrose | 2.26 | 2.26 |
| Salt | 0.04 | 0.04 |

-continued

| | | |
|---|---|---|
| Carrageenan | 0.04 | 0.04 |
| Vanilla creme flavor | 1.70 | 1.70 |
| Non-fat dry milk | 6.32 | 8.42 |
| Yeast-whey | 2.10 | 0.00 |
| Water | 74.03 | 74.03 |

Directions
1. Mix dry ingredients.
2. Mix water in pan with dry ingredients and heat to 160° F. and hold for 10 minutes.
3. Cool to 70° F.

Codried yeast-whey product successfully replaced the non-fat dry milk in the pudding recipe.

Example V

Heated and browned codried yeast-whey can be used as a partial substitute for spices. The codried yeast-whey product when heated in oven at about 375° F. darkens to a color like cinnamon or nutmeg. After treatment the codried yeast-whey product can be added to natural spices with no yeasty, off-flavoring.

Example VI

Codried yeast-whey products can be used as flavor carriers. Codried yeast-whey product which is up to 30% by weight whey was mixed with an artificial liquid smoke flavor. A smoke flavoring such as is described in U.S. Pat. No. 3,615,728, here incorporated by reference, is added to the codried yeast-whey product in an amount of 2% by weight. The flavoring can be added in amounts ranging from about 2% to about 8% by weight.

Example VII

The codried yeast-whey product was used as an extruder in margarine and imitation margarines. Codried yeast whey was added to margarine or imitation "diet" margarine at a ratio of from about 1.5 parts codried yeast-whey to 98.5 parts margarine to about 5.0 parts codried yeast-whey to 95.0 parts margarine. Imitation diet margarines contain as little as 40% fat. The codried yeast-whey blend did not add yeasty or other off-flavors. The codried yeast-whey blend increased the spreadability and the creamy-fatty mouthfeel of the margarine.

Example VIII

Codried yeast-whey product was used to replace whole egg and nonfat dry milk in muffin mixes. Muffins were prepared according to the recipe in Table III at different levels of egg and nonfat dry milk replacement.

Expert taste panels could detect no yeast flavor at any nonfat dry milk replacement level. The muffin volume and texture was uneffected. With egg replacement less than 75% by weight, taste panels could detect no yeast flavor. Above 75% substitution of egg by codried yeast-whey the muffins had a gummy texture and low volume.

The following Examples IX, X, and XI of luncheon loaves were prepared as shown, baked at 200° F. and tested. The luncheon loaves containing the codried yeast-whey product all exhibited synergistic properties. The flavor was better and the shrinkage and liquids which cooked off is less than would be expected if whey and yeast containing loaves were examined individually.

TABLE III
REPLACEMENT OF EGG AND NFDM IN MUFFIN MIX

| Ingredients | Control | Test 1 | Test 2 | Test 3 | Test 4 | Test 5 | Test 6 |
|---|---|---|---|---|---|---|---|
| All purpose flour | 168.0 | 168.0 | 168.0 | 168.0 | 168.0 | 168.0 | 168.0 |
| Sugar | 120.0 | 120.0 | 120.0 | 120.0 | 120.0 | 120.0 | 120.0 |
| Shortening | 52.0 | 52.0 | 52.0 | 52.0 | 52.0 | 52.0 | 52.0 |
| Salt | 4.0 | 4.0 | 4.0 | 4.0 | 4.0 | 4.0 | 4.0 |
| Non-fat dry milk | 26.0 | 26.0 | 26.0 | 26.0 | 18.2 | 6.5 | 0.0 |
| Baking powder | 8.0 | 8.0 | 8.0 | 8.0 | 8.0 | 8.0 | 8.0 |
| Dry whole egg | 16.0 | 8.0 | 4.0 | 0.0 | 4.8 | 16.0 | 16.0 |
| Emulsifier | 3.0 | 3.0 | 3.0 | 3.0 | 3.0 | 3.0 | 3.0 |
| Color | 1.0 | 1.0 | 1.0 | 1.0 | 1.0 | 1.0 | 1.0 |
| Flavor (vanilla) | 2.0 | 2.0 | 2.0 | 2.0 | 2.0 | 2.0 | 2.0 |
| Water | 160.0 | 160.0 | 160.0 | 160.0 | 160.0 | 160.0 | 160.0 |
| Codried yeast-whey | 0.0 | 8.0 | 12.0 | 16.0 | 19.0 | 19.5 | 26.0 |
| Egg replacement level | 0.0 | 50% | 75% | 100% | 70% | 0.0 | 0.0 |
| NFDM replacement level | 0.0 | 0.0 | 0.0 | 0.0 | 30% | 75% | 100% |

Example IX

| Luncheon Loaves | 1 | 2 | 3 | 4 | 5 | 6 |
|---|---|---|---|---|---|---|
| Beef Trim 10% fat (% wt) | 19.9 | 19.9 | 19.9 | 19.9 | 19.9 | 19.9 |
| Beef Trim 50% Fat % | 40.3 | 40.3 | 40.3 | 40.3 | 40.3 | 40.3 |
| Pork Trim 50% Fat % | 18.3 | 18.3 | 18.3 | 18.3 | 18.3 | 18.3 |
| Non Fat Dry Milk % | 4.6 | — | — | — | 1.86 | — |
| Whey Powder % | — | 4.6 | — | — | — | 2.3 |
| Codried yeast-whey % | — | — | 4.6 | — | — | 2.3 |
| Yeast % | — | — | — | 4.6 | 2.76 | — |
| Ice % | 11.4 | 11.4 | 11.4 | 11.4 | 11.4 | 11.4 |
| Salt % | 1.5 | 1.5 | 1.5 | 1.5 | 1.5 | 1.5 |
| Dextrose % | 1.5 | 1.5 | 1.5 | 1.5 | 1.5 | 1.5 |
| Grd. White Pepper % | .18 | .18 | .18 | .18 | .18 | .18 |
| Nutmeg % | .10 | .10 | .10 | .10 | .10 | .10 |
| Onion Powder % | .02 | .02 | .02 | .02 | .02 | .02 |
| Cure Solution* % | 2.2 | 2.2 | 2.2 | 2.2 | 2.2 | 2.2 |
| Average shrinkage % by weight | 25 | 19 | 8 | 8 | 10 | 15 |
| Liquids cooked off (gm) | 135 | 100 | 40 | 40 | 45 | 75 |

*Cure Solution:
Water 97.5
Sodium Nitrite .5
Sodium Erythorbate 2

Example X

| Luncheon Loaf | 1 | 2 | 3 | 4 | 5 | 6 | 7 |
|---|---|---|---|---|---|---|---|
| Beef Trim 10% Fat % (wt) | 18.72 | 18.72 | 18.72 | 18.72 | 18.72 | 18.72 | 18.72 |
| Beef Trim 50% Fat % | 30.35 | 30.35 | 30.35 | 30.35 | 30.35 | 30.35 | 30.35 |
| Pork Trim 50% Fat % | 29.43 | 29.43 | 29.43 | 29.43 | 29.43 | 29.43 | 30.35 |
| Nonfat Dry Milk % | 4.6 | — | — | — | 1.86 | — | — |
| Whey % | — | 4.6 | — | — | — | 2.3 | 1.86 |
| Codried yeast-whey & | — | — | 4.6 | — | — | 2.3 | — |
| Yeast % | — | — | — | 4.6 | 2.76 | — | 2.76 |
| Ice % | 11.4 | 11.4 | 11.4 | 11.4 | 11.4 | 11.4 | 11.4 |
| Salt % | 1.5 | 1.5 | 1.5 | 1.5 | 1.5 | 1.5 | 1.5 |
| Dextrose % | 1.5 | 1.5 | 1.5 | 1.5 | 1.5 | 1.5 | 1.5 |
| Grd. White Pepper % | .18 | .18 | .18 | .18 | .18 | .18 | .18 |
| Nutmeg % | .10 | .10 | .10 | .10 | .10 | .10 | .10 |
| Onion Powder % | .02 | .02 | .02 | .02 | .02 | .02 | .02 |
| Cure Solution* % | 2.2 | 2.2 | 2.2 | 2.2 | 2.2 | 2.2 | 2.2 |
| Average Shrinkage (%) | 26 | 30 | 26 | 14 | 21 | 26 | 22 |
| Liquid Cooked off (gm) | 125 | 150 | 130 | 70 | 105 | 130 | 105 |

*Cure Solution:
Water 97.5
Sodium Nitrite .5
Sodium Erythrobate .2

Example XI

| Luncheon Loaves | 1 | 2 | 3 | 4 | 5 | 6 |
|---|---|---|---|---|---|---|
| Beef Trim (50% fat) % | 23.45 | 23.45 | 23.45 | 23.45 | 23.45 | 23.45 |
| Beef Trim (15% fat) % | 23.45 | 23.45 | 23.45 | 23.45 | 23.45 | 23.45 |
| Pork Trim (50% fat) % | 19.9 | 19.9 | 19.9 | 19.9 | 19.9 | 19.9 |
| Pork Trim (25% fat) % | 11.7 | 11.7 | 11.7 | 11.7 | 11.7 | 11.7 |
| NonFat Dry Milk % (wt) | 4.6 | — | — | — | 1.86 | — |
| Whey % | — | 4.6 | — | — | — | 1.86 |
| Codried yeast-whey % | — | — | 4.6 | — | — | — |
| Yeast % | — | — | — | 4.6 | 2.76 | 2.76 |
| Ice % | 11.4 | 11.4 | 11.4 | 11.4 | 11.4 | 11.4 |
| Salt % | 1.5 | 1.5 | 1.5 | 1.5 | 1.5 | 1.5 |
| Dextrose % | 1.5 | 1.5 | 1.5 | 1.5 | 1.5 | 1.5 |
| Grd. White Pepper % | .18 | .18 | .18 | .18 | .18 | .18 |
| Nutmeg % | .10 | .10 | .10 | .10 | .10 | .10 |
| Onion Powder % | .02 | .02 | .02 | .02 | .02 | .02 |
| Cure Solution* % | 2.2 | 2.2 | 2.2 | 2.2 | 2.2 | 2.2 |
| Liquid cooked off (gm) | 95 | 50 | 35 | 41 | 45 | 65 |
| Average shrinkage (%) | 13 | 10 | 7 | 7 | 7 | 12 |

*Cure Solution:
Water 97.5
Sodium Nitrite .5
Sodium Erythorbate .2

Example XII

Chocolate Chiffon pie filling:

| INGREDIENTS | PERCENT BY WEIGHT | |
|---|---|---|
| | Test | Control |
| Modified starch | 5.00 | 5.00 |
| Nonfat dry milk | 18.00 | 30.00 |
| Cocoa | 18.00 | 18.00 |
| Gelatin | 3.00 | 3.00 |
| Whipping Agent | 5.40 | 5.40 |
| Baking soda | 0.50 | 0.50 |
| Dextrose | 10.00 | 10.00 |
| Sugar | 28.00 | 28.00 |
| Vanilla, powdered | 0.10 | 0.10 |
| Codried yeast-whey | 12.00 | 0.00 |

DIRECTIONS

Dry blend all ingredients until thoroughly mixed.
Package directions would read:
1. Place 5¾ oz of mix in small bowl.
2. Add 8 oz boiling water to bowl, blend to thoroughly wet the mix.
3. Beat on high speed for 4–5 minutes.
4. Fill pastry shell and chill.

A chiffon chocolate pie prepared according to this recipe has an increased chocolate flavor, and no undesirable yeasty flavor.

Example XIII

Dry mushroom soup base.

| INGREDIENTS | PERCENT BY WEIGHT | |
|---|---|---|
| | Test | Control |
| Nonfat dry moil | 27.24 | 34.05 |
| Shortening | 19.52 | 19.52 |
| Wheat flour | 17.52 | 17.52 |
| Cereal solids | 17.65 | 17.65 |
| Salt | 5.00 | 5.00 |
| Mushroom flavor | 0.10 | 0.10 |
| Dry mushroom powder | 3.20 | 3.20 |
| Monosodium glutamate | 1.90 | 1.90 |
| Onion powder | 1.00 | 1.00 |
| White pepper | 0.06 | 0.06 |
| Codried yeast-whey | 6.81 | 0.00 |

DIRECTIONS

1. Dry mix all ingredients.

The dry mushroom soup prepared in this recipe has a good mushroom flavor, and has no yeasty off-flavor.

Example XIV

| Ingredients | Chicken* coating | | | |
|---|---|---|---|---|
| | C | 1 | 2 | 3 |
| All purpose flour | 100.0 | 100.0 | 100.0 | 100.0 |
| Baking soda | .28 | .20 | .20 | .20 |
| salt | 2.82 | 2.82 | 2.82 | 2.82 |
| pepper | 1.41 | 1.41 | 1.41 | 1.41 |
| water | 182.2 ml | 182.2 ml | 182.2 ml | 182.2 ml |
| Codried yeast-whey | — | 3.39 | — | — |
| Yeast | — | — | 3.39 | — |
| Dry blended yeast-whey | — | — | — | 3.39 | recorded in grams procedure

1. Dry blend ingredients in N-50.

-continued

| | | |
|---|---|---|
| 2. | Add water mix for 5–8 minutes on speed 1. | |
| 3. | Let batter rest for 10–15 minutes. | |
| 4. | Coat chicken,** fry at 300° for 5 minutes. | |

*Chicken has been pre-cooked.
Results:
The tests were done 3 times using the same batter each time. The following items were tested for: Adhesion, color, crispness, and flavor.

A chicken coating mix was prepared according to the previous recipe. The codried yeast-whey coating adhered to the chicken better than other tested mixture.

It will be obvious to those skilled in the art that many variations can be made from these examples, shown only for purposes of illustration, without departing from the scope of this invention.

We claim:

1. A process for making an improved food product comprising, forming an aqueous suspension of whey and yeast which contains 20% to 50% by weight whey solids, wherein the yeast is in the form of a yeast cream which contains from about 10% to 20% by weight solids and the whey is in the form of a suspension containing from about 3.0% to about 70% by weight solids,
   spray drying the thus formed suspension, and recovering the spray dried free flowing product.

2. The process in claim 1 wherein the yeast cream is from about 17% to 18% by weight solids.

3. The process in claim 1 wherein the yeast-whey suspension is from about 15% to about 30% in total solids and of the total solids the whey is about 20% to 50%, and the yeast is about 80% to 50%.

4. The process in claim 1 wherein the yeast and the whey are separately pasteurized prior to spray drying.

5. The process in claim 1 wherein the yeast and whey are pasteurized after being combined.

6. The process in claim 3 wherein the pasteurization is performed at a temperature from about 160° F. to about 195° F.

7. The process of claim 1 wherein the yeast-whey suspension is spray-dried at a temperature sufficiently high to produce the product with 5% by weight or less moisture.

8. The product of the process of claim 1.

9. The product of the process of claim 5.

10. A process for making an improved food product, forming an aqueous suspension of whey and *Candida utilus* which contains 20% to 50% by weight whey solids wherein the *Candida utilis* is in the form of a yeast cream which contains from about 10% to about 20% by weight solids and the whey is in the form of a suspension containing from about 3.0% to about 70% by weight solids,
   spray drying the thus formed suspension, and recovering the spray dried free flowing product.

11. The process of claim 10 wherein the formed suspension is spray dried at an outlet temperature between about 180° F. and 210° F.

12. The process of claim 10 wherein the formed suspension is pasteurized at a temperature between about 160° F and 195° F.

13. The process of claim 10 wherein the yeast-whey suspension is spray dried at a temperature sufficiently high to produce the product with 5% by weight or less moisture.

14. The process in claim 10 wherein the whey is present solids in the suspension at 30% by weight.

15. The process in claim 10 wherein the whey is present solids in the suspension at 40% by weight.

16. The product of the process of claim 10.

17. The product of the process of claim 14.

18. The product of the process of claim 15.

* * * * *

UNITED STATES PATENT OFFICE
CERTIFICATE OF CORRECTION

Patent No. 4,182,777    Dated January 8, 1980

Inventor(s) Elmer J. Saunders and Terry A. Lappin

It is certified that error appears in the above-identified patent and that said Letters Patent are hereby corrected as shown below:

| Column | Line |
|--------|------|
| 7 | Example X, Pork Trim "    " in the third line under 7 should be --29.43--. |

Signed and Sealed this

*Twenty-seventh* Day of *November 1984*

[SEAL]

*Attest:*

*Attesting Officer*

GERALD J. MOSSINGHOFF

*Commissioner of Patents and Trademarks*